(12) United States Patent
Salter et al.

(10) Patent No.: US 11,902,763 B1
(45) Date of Patent: Feb. 13, 2024

(54) HITCH INTEGRATED DEPLOYABLE UMBRELLA SYSTEM WITH SOUND EXCITER

(71) Applicant: Ford Global Technologies, LLC, Dearborn, MI (US)

(72) Inventors: Stuart C. Salter, White Lake, MI (US); Hussein Berry, Dearborn, MI (US); Ryan O'Gorman, Beverly Hills, MI (US); Gabriella Jacobsen, Ferndale, MI (US); Paul Kenneth Dellock, Northville, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/883,988

(22) Filed: Aug. 9, 2022

(51) Int. Cl.
*H04R 7/06* (2006.01)
*B60R 11/02* (2006.01)

(52) U.S. Cl.
CPC ............ *H04R 7/06* (2013.01); *B60R 11/0217* (2013.01); *H04R 2499/13* (2013.01)

(58) Field of Classification Search
CPC ...... H04R 7/06; H04R 2499/13; H04R 1/345; B60R 11/0217; B62D 33/023; B62D 33/027; B62D 33/03; B62D 33/033
See application file for complete search history.

(56) References Cited

U.S. PATENT DOCUMENTS

| | | | |
|---|---|---|---|
| 10,005,382 B1 * | 6/2018 | Rossi | B60P 3/0255 |
| 10,094,138 B2 | 10/2018 | Gharabegian | |
| 10,316,542 B2 | 6/2019 | Gharabegian | |
| 10,323,433 B2 | 6/2019 | Gharabegian | |
| 10,641,004 B2 | 5/2020 | Gharabegian | |
| 11,001,313 B2 * | 5/2021 | Turner | A45B 23/00 |
| 11,096,458 B1 | 8/2021 | Volin | |
| D930,515 S * | 9/2021 | Craford | D12/162 |
| 11,242,097 B1 * | 2/2022 | Gross, IV | H04R 5/02 |
| 2005/0241546 A1 | 11/2005 | Royse | |
| 2010/0065593 A1 * | 3/2010 | Campbell | B60R 9/065 224/42.32 |
| 2016/0066664 A1 * | 3/2016 | Liu | A45B 3/00 381/77 |
| 2018/0132047 A1 * | 5/2018 | Henry | H04R 5/02 |
| 2018/0187447 A1 | 7/2018 | Gharabegian | |
| 2018/0313109 A1 | 11/2018 | Gharabegian | |
| 2018/0340345 A1 | 11/2018 | Gharabegian | |
| 2019/0169872 A1 | 6/2019 | Gharabegian | |
| 2019/0281935 A1 | 9/2019 | Gharabegian | |
| 2019/0292805 A1 | 9/2019 | Gharabegian | |
| 2019/0343253 A1 | 11/2019 | Gharabegian | |

(Continued)

FOREIGN PATENT DOCUMENTS

| | | |
|---|---|---|
| CN | 208769018 U | 4/2019 |
| KR | 101981427 B1 | 8/2019 |

*Primary Examiner* — Jason R Kurr

(74) *Attorney, Agent, or Firm* — Vichit Chea; Carlson, Gaskey & Olds, P.C.

(57) ABSTRACT

An apparatus includes, among other things, a support configured to be connected to a power source and at least one rigid panel attached to the support. The at least one rigid panel is moveable between a deployed position and a stowed position. At least one exciter is supported on the at least one rigid panel and is configured to selectively generate sound when powered by the power source.

24 Claims, 6 Drawing Sheets

(56) References Cited

U.S. PATENT DOCUMENTS

| | | |
|---|---|---|
| 2019/0360230 A1 | 11/2019 | Gharabegian |
| 2019/0360231 A1 | 11/2019 | Gharabegian |
| 2021/0085075 A1* | 3/2021 | Volin ................... A47B 37/04 |
| 2022/0248134 A1* | 8/2022 | Pelissier ............. G10L 21/0216 |

* cited by examiner

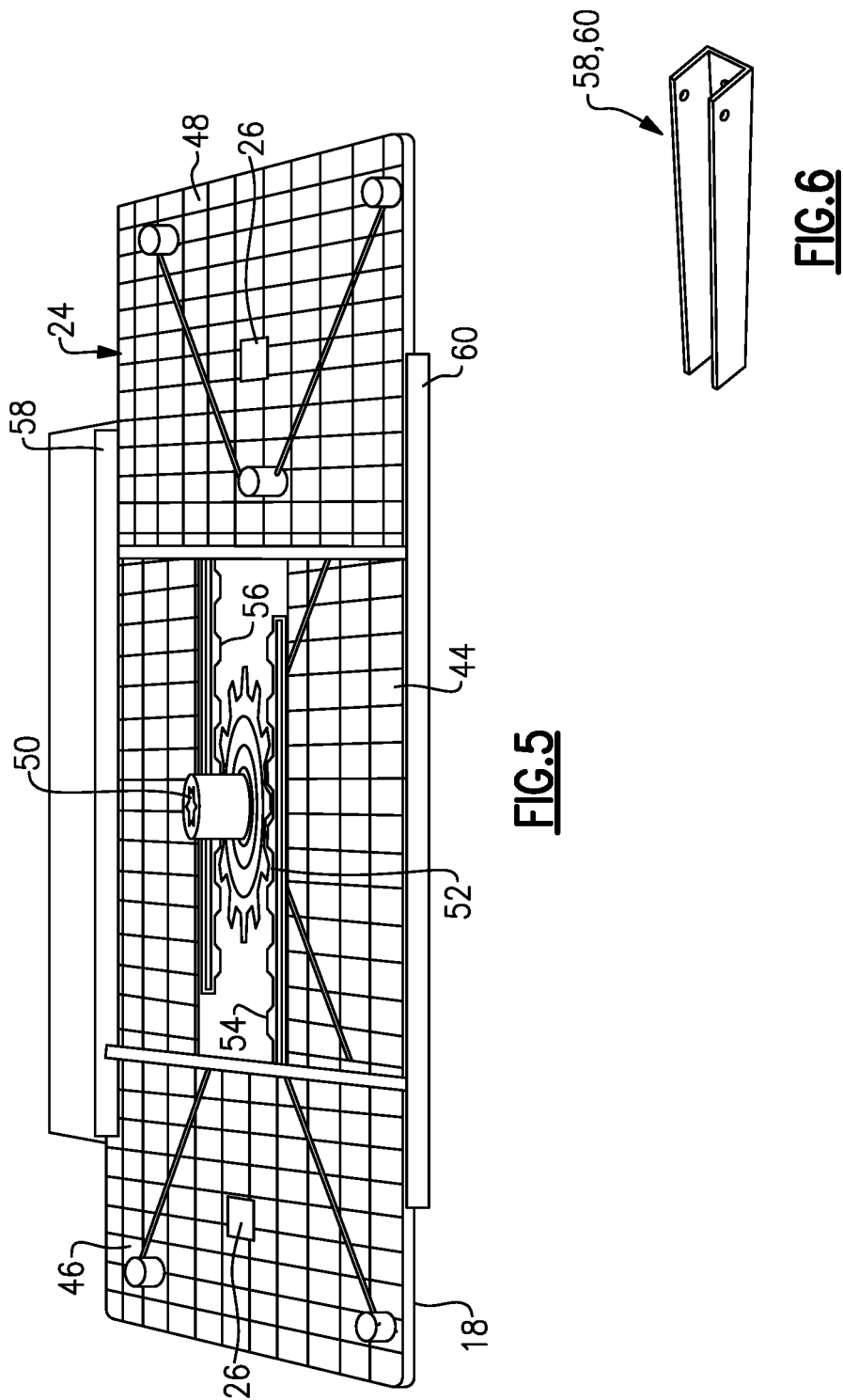

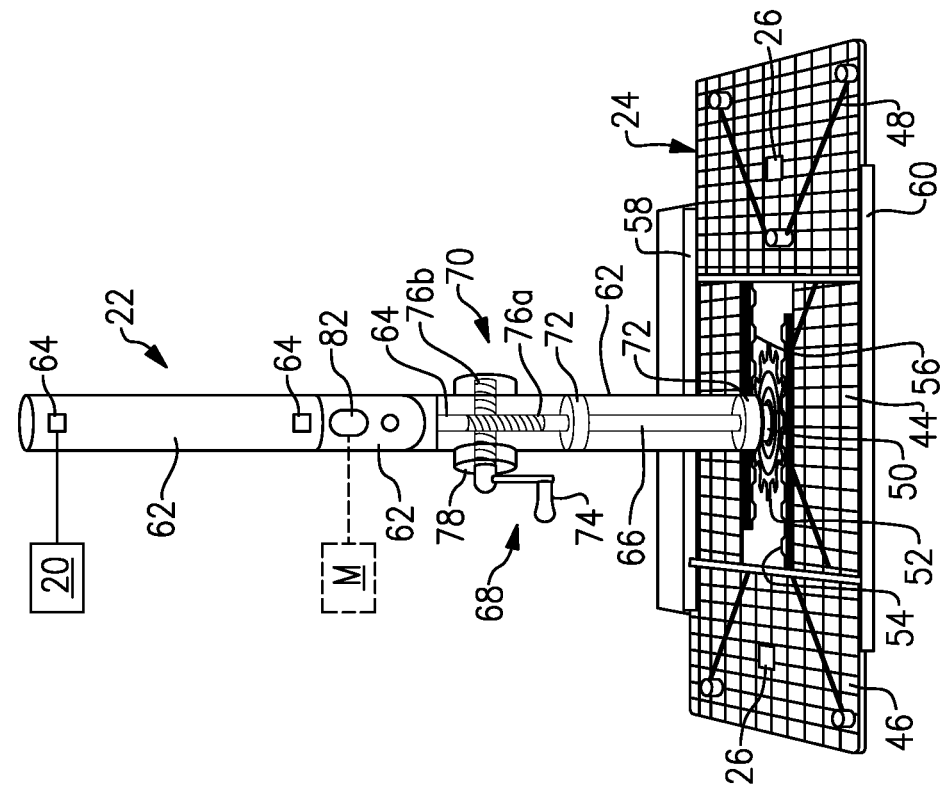
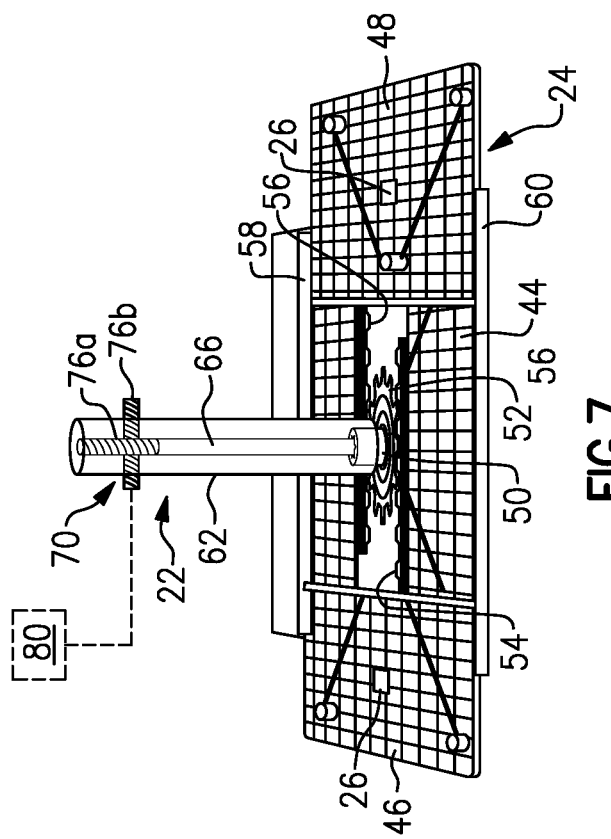
FIG.8
FIG.7

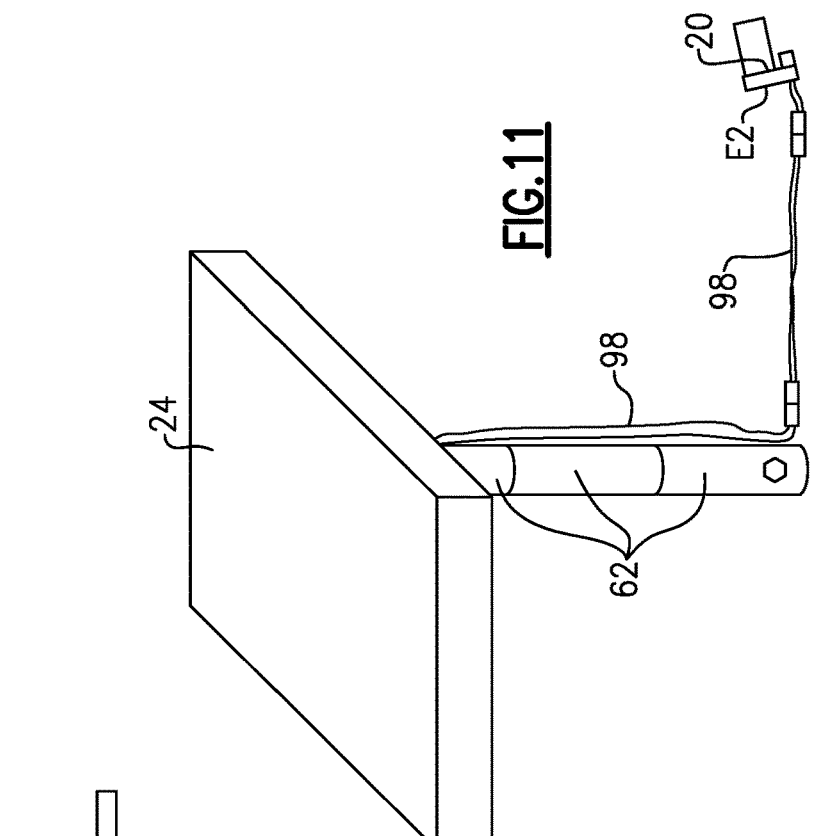
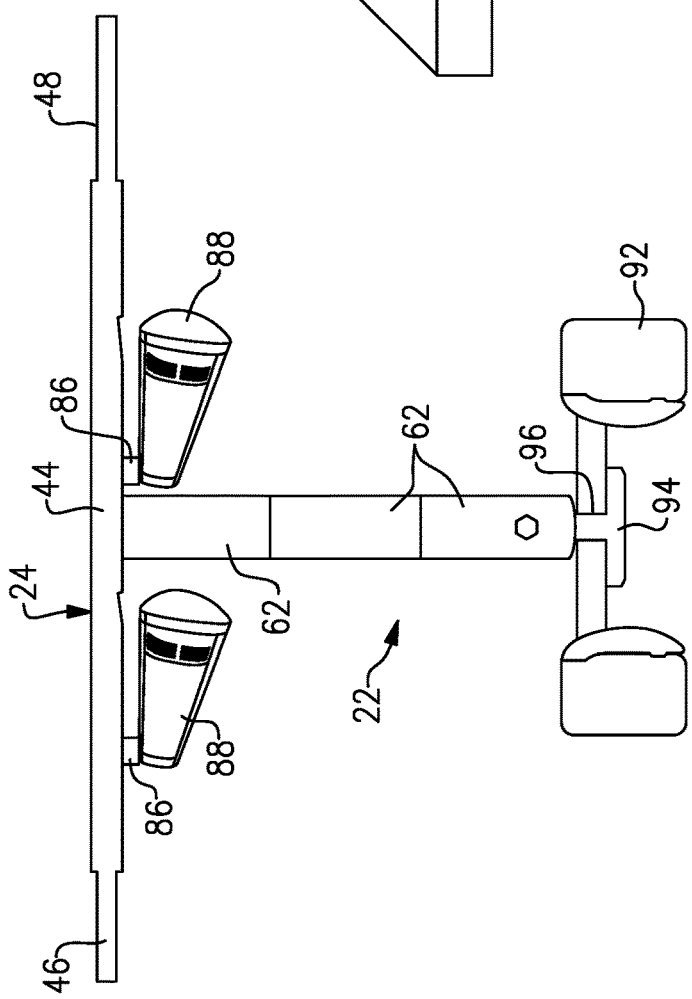

HITCH INTEGRATED DEPLOYABLE UMBRELLA SYSTEM WITH SOUND EXCITER

TECHNICAL FIELD

This disclosure relates generally to an umbrella that is electrically connected to an electric vehicle hitch, and more particularly to an umbrella that is comprised of one or more rigid panels, and which includes a sound exciter that is associated with one of the rigid panels to provide a speaker function.

BACKGROUND

Vehicles are used to provide a power source for various stand-alone purposes such as worksite and entertainment applications. Providing additional functionality for vehicles from a connectivity aspect is continually sought after.

SUMMARY

In some aspects, the techniques described herein relate to an apparatus including: a support configured to be connected to a power source; at least one rigid panel attached to the support, the at least one rigid panel being moveable between a deployed position and a stowed position; and at least one exciter supported on the at least one rigid panel, wherein the at least one exciter is configured to selectively generate sound when powered by the power source.

In some aspects, the techniques described herein relate to an apparatus, wherein the power source comprises an electric trailer hitch receiving power from a vehicle power source.

In some aspects, the techniques described herein relate to an apparatus, wherein the at least one exciter comprises a sound generating speaker that is mounted to the at least one rigid panel.

In some aspects, the techniques described herein relate to an apparatus, the apparatus including at least one vehicle sensor that estimates a user distance from the at least one exciter to control volume of the sound generating speaker, and wherein if the user moves beyond a predetermined distance the at least one exciter is turned off.

In some aspects, the techniques described herein relate to an apparatus, wherein the at least one rigid panel comprises a plurality of rigid panels that are attached to each other and that cooperate to provide a shielding umbrella effect when in the deployed position.

In some aspects, the techniques described herein relate to an apparatus, the apparatus including a drive mechanism configured to move the plurality of rigid panels between the deployed position and the stowed position.

In some aspects, the techniques described herein relate to an apparatus, wherein, when in the stowed position, one or more of the plurality of rigid panels comprise a vehicle load floor.

In some aspects, the techniques described herein relate to an apparatus, wherein the vehicle load floor is positioned to enclose a recessed storage area.

In some aspects, the techniques described herein relate to an apparatus, wherein the plurality of rigid panels comprises at least three panels comprising a center panel, a first end panel on one side of the center panel, and a second end panel on an opposite side of the center panel, and including a center hub located on the center panel, the center hub comprising a part of the drive mechanism.

In some aspects, the techniques described herein relate to an apparatus, wherein the drive mechanism comprises a rack and pinion system including a drive gear in driving engagement with a first set of gear teeth associated with the first end panel and a second set of gear teeth associated with the second end panel, and wherein the center hub comprises the drive gear which selectively drives the first and second sets of gear teeth to move the first and the second end panels between the deployed and stowed position.

In some aspects, the techniques described herein relate to an apparatus, the apparatus including a first guide rail extending along one edge of the first and the second end panels and a second guide rail extending along an opposite edge of the first and the second end panels, and wherein the first and second guide rails guide sliding movement of the first and the second end panels between the deployed position and the stowed position.

In some aspects, the techniques described herein relate to an apparatus, wherein the support comprises one or more tubular members, and wherein each tubular member has an electrical connection interface to electrically connect the tubular members to each other and to the power source.

In some aspects, the techniques described herein relate to an apparatus, the apparatus including a drive shaft coupled to the center hub and an input configured to selectively drive the drive shaft which causes the center hub to rotate and move the first and the second end panels between the deployed position and the stowed position.

In some aspects, the techniques described herein relate to an apparatus, wherein the tubular members are selectively detachable from each other and stored within a recessed storage area covered by a load floor, and wherein at least one of the plurality of rigid panels comprises a portion of the load floor.

In some aspects, the techniques described herein relate to an apparatus, wherein the power source comprises a vehicle power source and wherein the at least one rigid panel is selectively removable from a vehicle to provide a stand-alone umbrella.

In some aspects, the techniques described herein relate to an apparatus, the apparatus including at least one additional electrical connection associated with the at least one rigid panel to connect to at least one additional electrical component.

In some aspects, the techniques described herein relate to an apparatus, wherein the at least one rigid panel is formed from a material comprising polypropylene with glass fibers and maleated polypropylene (MAPP).

In some aspects, the techniques described herein relate to an apparatus, wherein the at least one rigid panel can be tilted between a plurality of use positions when in the deployed position.

In some aspects, the techniques described herein relate to a method including: connecting a support to a power source; attaching at least one rigid panel to the support such that the at least one rigid panel is moveable between a deployed position and a stowed position; and supporting at least one exciter on the at least one rigid panel such that the at least one exciter can selectively generate sound via the power source.

In some aspects, the techniques described herein relate to a method, wherein the power source comprises an electric trailer hitch receiving power from a vehicle power source, and wherein the at least one rigid panel comprises a plurality of rigid panels that are attached to each other and that cooperate with each other to provide a shielding umbrella effect when in the deployed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 is a view similar to FIG. 4 but showing the rigid panels in the deployed position.

FIG. 6 is a perspective view of a guide channel as used in the umbrella system of FIGS. 4-5.

FIG. 7 shows the panels of FIG. 5 connected to a portion of a support and drive mechanism for the panels.

FIG. 8 shows the full support and drive mechanism.

FIG. 10 schematically shows an example of a stand-alone umbrella configuration.

FIG. 11 schematically shows an example of a stand-alone umbrella configuration with an external electrical connection.

DETAILED DESCRIPTION

This disclosure is directed to an umbrella that is comprised of one or more rigid panels as opposed to traditional fabric panels. A sound exciter is associated with one or more of the rigid panels to provide a speaker function. The umbrella can be connected to an electrically integrated trailer hitch such that power can be provided to the umbrella. The umbrella is comprised of panels that can be deployed manually or automatically via a drive system. The umbrella can be supported on the hitch itself, can be supported in a stand-alone configuration, or can be supported on a truck bed and can serve as a load bearing floor when stowed. These and other features will be discussed in greater detail below.

Figure 1:
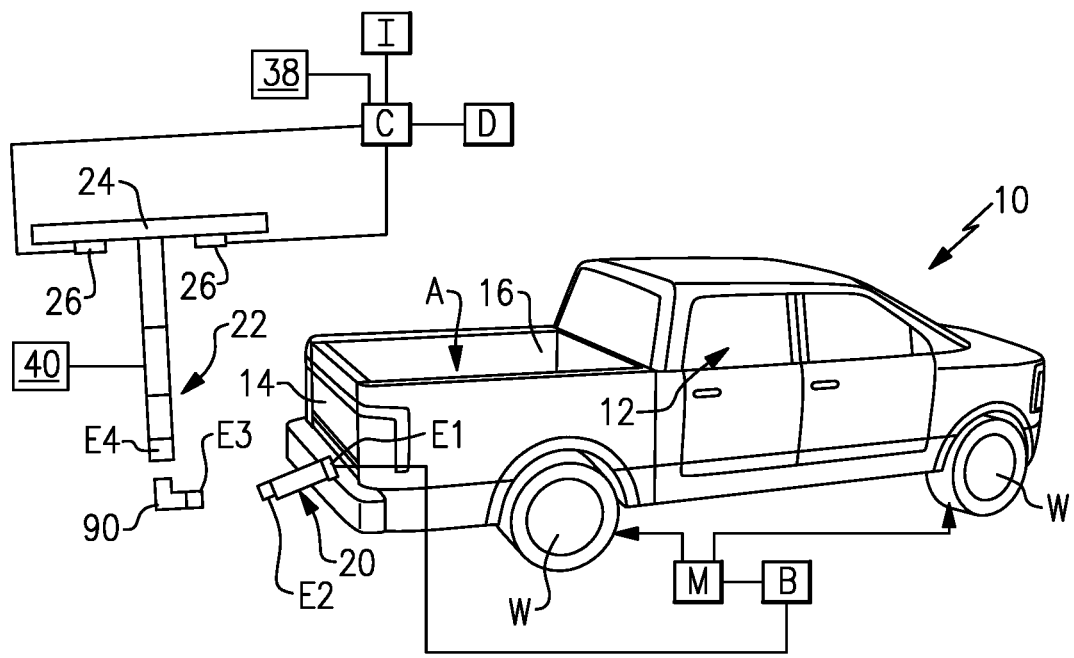
FIG. 1 is a schematic illustration of a vehicle including an integrated electrical hitch and an umbrella system with at least one exciter to be electrically connected to the hitch.

FIG. 1 shows a vehicle 10 having a passenger compartment 12 and a tailgate 14 that encloses one end of a cargo bed 16 that is aft of the passenger compartment 12. The cargo bed 16 has a floor/support surface 18 (FIG. 3) and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10. In one example, the vehicle 10 includes an electrical hitch 20 that is powered by a vehicle power source such as the traction battery back B, for example. The hitch 20 is capable of towing a trailer, supporting a bike rack, etc. The hitch includes an electrical connection interface E1 to the vehicle power source and includes another electrical connection interface E2 that is integrated into the hitch itself such that the hitch 20 can provide power to other components that are attached to, or supported by, the hitch 20. One example of an integrated electric hitch 20 is found in application U.S. Ser. No. 17/831,132, filed on Jun. 2, 2022, which is assigned to the assignee of the subject application and is herein incorporated by reference.

In one example, the disclosure provides a support 22 configured to be connected to the power source via the hitch 20 and at least one rigid panel 24 that is attached to the support 22. The support 22 is connected to, or supported on, the hitch 20 such that the support 22 and hitch 20 are electrically connected. In one example, an adaptor bracket 90 is used to connect the support 22 to the hitch 20. The adaptor bracket 90 has an electrical connection interface E3 that electrically connects an electrical connection interface E4 of the support 22 to the electrical connection interface E3 of the hitch 20. The at least one rigid panel 24 is moveable between a deployed position and a stowed position. In the deployed position, the panel 24 provides shade and protection from the sun. When in the stowed position, the rigid panel 24 is stored within the vehicle 10.

In one example, the rigid panel 24 comprises a generally flat, plate-like structure having a polygonal shape; however, other shapes could also be used. At least one exciter 26 is supported on the rigid panel 24 and is configured to selectively generate sound when powered by the power source. The exciter 26 is weatherproofed to protect the exciter 26 from external elements. One or more of the exciters 26 are mounted to the rigid panel 24 to selectively generate a desired noise based on a selected user input from a vehicle interface or smart device. The combination of the exciters 26 and rigid panel 24 comprises a speaker that can be used in many ways. For example, it can be part of an entertainment center and can be used as an auxiliary speaker for a sound system receiving input from a radio or smart device D.

The user attaches the umbrella attachment support 22 to the vehicle hitch 20 during which the umbrella is mechanically and electrically linked to a vehicle interface I and power source B. A controller C is provided such that the vehicle and/or user smart device D can control operation of the exciters 26 and panels 24 via the wired connection and/or BLE based communication. The vehicle sound system and/or user's smart device D can also be linked to the control other components on the umbrella panels 24. This will be discussed in greater detail below.

Figure 2:
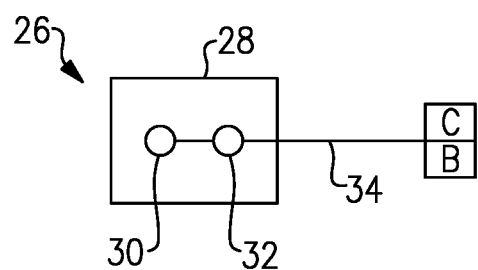
FIG. 2 is a schematic representation of the exciter of FIG. 1.

In one example, the exciter 26 includes a housing 28 (FIG. 2) with internal components such as a driver/actuator 30 and voice coil 32 that are used to generate sound. The driver/actuator 30 can be a motor assembly, for example. The voice coil 32 is coupled directly to the mount surface of the rigid panel 24, which allows it to amplify the sound and make it a "speaker." The exciter 26 includes a wire connection 34 to the power source B and controller C. In one example, the control module or controller C comprises a processor, memory, and one or more input and/or output device interfaces that are communicatively coupled via a local interface. The controller C may be a hardware device for executing software and can be a custom made or commercially available processor, a central processing unit, microprocessor or generally any device for executing software instructions. When it is determined that the exciter 26 is to communicate a noise to the surrounding environment, the control module C generates a signal that is transmitted to the exciter 26 and it begins to vibrate at the frequency of the signal. These vibrations transfer through the mount surface of the rigid panel 24 to emit the desired sound.

In one example, the wire connection 34 connects to an electrical connection interface that connects to the hitch 20. In another example, connection to the exciter 26 can be done via wireless power delivery with wireless audio delivery.

In one example, at least one vehicle sensor 38 is used to estimate a user distance from the exciter 26 to control the volume of the sound generating speaker. The vehicle sensor 38 can comprise one or more of a camera, radar sensor, or sonar sensor for example. In one example, if the user moves beyond a predetermined distance the at least one exciter 26 is turned off to conserve energy.

In one example, the at least one rigid panel 24 comprises a plurality of rigid panels 24 that are attached to each other. The plurality of rigid panels 24 cooperate with each other to provide a shielding umbrella effect when in the deployed position.

In one example, a drive mechanism 40 is configured to move the plurality of rigid panels 24 between the deployed position and the stowed position. The drive mechanism 40 can be manually driven or driven via a powered actuator, for example.

Figure 3:
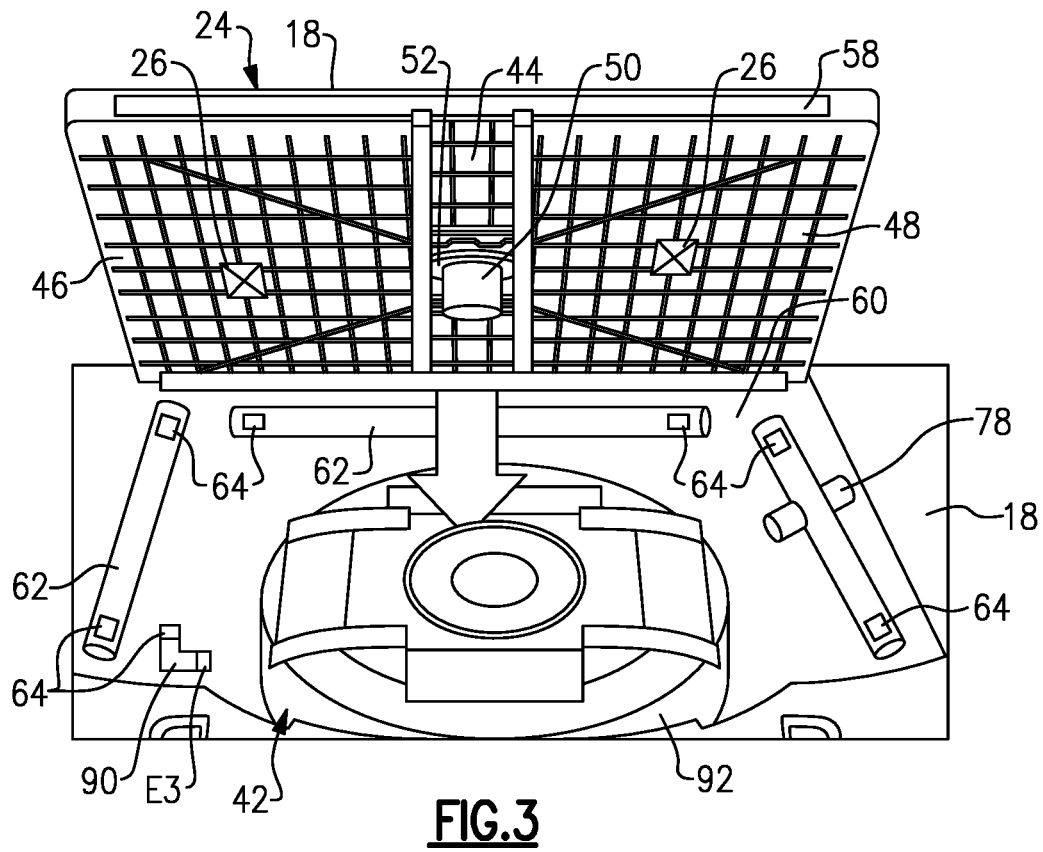
FIG. 3 is a perspective view of an umbrella system that is stored within a recessed cargo area and which includes one or more rigid panels that form part of a vehicle load floor.

In one example, the rigid panels 24 are configured to provide a floor surface 18 for the vehicle 10. As shown in FIGS. 3-8, the rigid panel 24 comprises a square or rectangular flat plate. When in the stowed position, one or more of the plurality of rigid panels 24 comprise a vehicle load floor 18 that can support cargo. In one example, the vehicle load floor 18 is positioned to enclose a recessed storage area 42 (FIG. 3).

In one example, the plurality of rigid panels 24 comprises at least three panels 24 comprising a base/center panel 44, a first end panel 46 on one side of the center panel 44, and a second end panel 48 on an opposite side of the center panel 44. The base center panel 44 has a center attachment hub 50 that is located in the middle of the center panel 44, and which is used to connect to the center support 22. In one example, the center attachment hub 50 is a part of the drive mechanism 40.

In one example, the drive mechanism 40 comprises a rack and pinion system (FIG. 5) that is used to move the outer end panels 46, 48 in and out relative to the center base panel 44. In one example, the rack and pinion system includes a drive gear 52 in driving engagement with a first set of gear teeth 54 associated with the first end panel 46 and a second set of gear teeth 56 associated with the second end panel 48. The center hub 50 comprises the drive gear 52 which selectively drives the first 54 and second 56 sets of gear teeth to move the first 46 and the second 48 end panels between the deployed and stowed position.

In one example, a first guide rail 58 extends along one edge of the first 46 and the second 48 end panels and a second guide rail 60 extends along an opposite edge of the first 46 and the second 48 end panels. The two side end panels 46, 48 are fitted into the guide rails 58, 60. The first 58 and second 60 guide rails guide sliding movement of the first 46 and the second 48 end panels between the deployed position and the stowed position. In one example shown in FIG. 6, the guide rails 58, 60 comprise U-shaped channels.

In one example, the support 22 comprises one or more tubular members 62 (FIGS. 1, 3, and 8). Each tubular member 62 has electrical connection interfaces 64 to electrically connect the tubular members 62 to each other and to the power source.

In one example, a drive shaft 66 (FIGS. 7-8) is coupled to the center hub 50. An input 68 is configured to selectively drive the drive shaft 66 which causes the center hub 50 to rotate and move the first 46 and the second 48 end panels between the deployed position and the stowed position. In one example, the input 68 is coupled to a gear drive 70 that is configured to rotate the drive shaft 66. In one example, the gear drive 70 comprises a worm gear set. The drive shaft 66 is supported by one or more bearings or bushings 72 to stabilize the shaft 66. In one example, one bushing 72 is located near a top end of the shaft 66 and another bushing 72 is located near a bottom end of the shaft 66 above the worm gear set 70. In one example, the drive shaft 66, gear drive 70, and bushings 72 are housed within the tubular members 62 such that these components are protected from the external environment.

In one example the worm gear set 70 includes a first gear 76a that extends in a vertical direction and a second gear 76b that extends in a horizontal direction and directly engages the first gear 76a. In one example, the input 68 comprises a hand crank 74 that drives the second gear 76b from the worm gear set 70. The worm gear set 70 is enclosed within a crank housing 78. The drive shaft 66 connects to the rack and pinion mechanism on a top end of the shaft 66 and connects to the worm gear set 70 on a bottom end of the shaft 66. Optionally, a power actuator 80 can be used to drive the gear set 70. The power actuator 80 can be a motor, solenoid, etc. and can be powered via a connection to the electrical hitch 20 or other vehicle power source.

As discussed above, when the side end panels 46, 48 are fully retracted the umbrella panels 24 double as a load floor 18. This makes it easy to stow the umbrella without taking up valuable cargo room. In one example, the umbrella system is designed to be stored in a spare tire compartment (FIG. 3) that comprises a recessed area 42 within the load floor 18. In one example, the support 22 is comprised of three tubular pole members 62 and an adaptor bracket 90 used to couple a bottom tubular member 62 to the hitch 20. The tubular pole members 62 are placed around the spare tire 92 and stowed within the open compartment area that surrounds the spare tire 92, and which is subsequently covered by the panels 24. Additionally, the center attachment hub 50, which is centered on the base panel 44, nests within a center opening of the spare tire 92 to provide for compact packaging.

Figure 4:
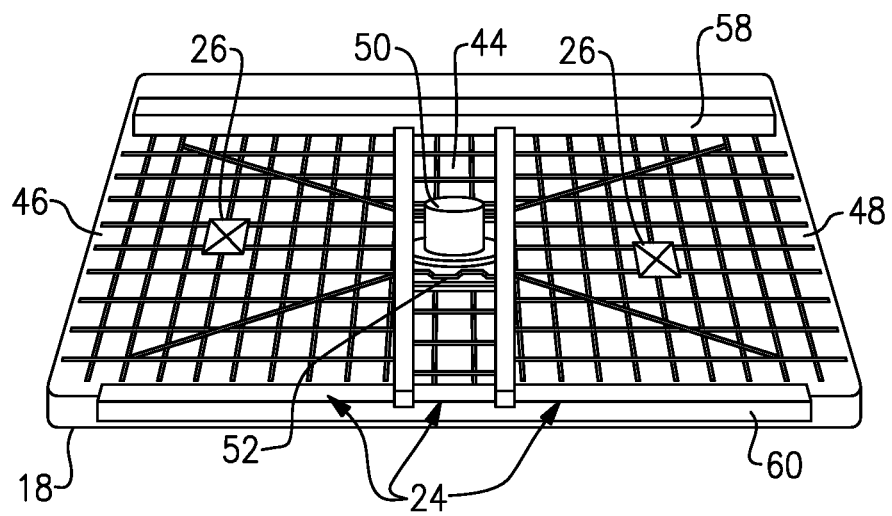
FIG. 4 is a view of the rigid panels of the umbrella in a non-deployed position.

In one example, the umbrella system is assembled/disassembled as follows. The panels 44, 46, 48 that form a portion of the load floor 18 are first pivoted to an upright position as shown in FIG. 3. The panels 44, 46, 48 are then flipped over such that the center hub 50 extends in an upward direction as shown in FIG. 4. The adaptor 90 and tubular members 62 (including the drive shaft 66, gear drive 70, and crank housing 78) can then be removed from the storage area 42 and assembled together as shown in FIGS. 7-8. The crank handle 74 is then rotated, which causes the side panels 46, 48 to move outwardly of the base panel 44 from the non-deployed position (FIG. 7) to the deployed position as shown in FIG. 8. To disassemble the umbrella system, a reverse order of steps is performed.

In one example, a tilting mechanism 82 can be incorporated into one of the tubular members 62. The tilting mechanism allows one tubular member 62 to be angled relative to another tubular member 62 such that the rigid panel 24 can be moved from a horizontal position to a tilted or angled position (indicated by the arrows in FIG. 9) to adjust for movement of the sun. In one example, the tilting mechanism 82 is manually operated via a push button and mechanical interface. Optionally, the tilting mechanism 82 can be controlled via a motor M and existing vehicle sensors 38 can be used to determine user position and sun position with subsequent control commands being generated to move and orient the panel(s) 24, 44, 46, 48 to provide maximum protection from the sun. Thus, the rigid panels 24 can be tilted between a plurality of use positions when in the deployed position In one example, the tubular members 62 are comprised of elongated, hollow aluminum tubes that include connection interfaces that allow the tubes to be attached and detached from each other such that the rigid panels 24 can be moved between the deployed and stowed positions. In one example, the tubular members 62 are selectively detachable from each other with quick connect/disconnect features and stored within the recessed storage area 42 as described above.

Figure 9:
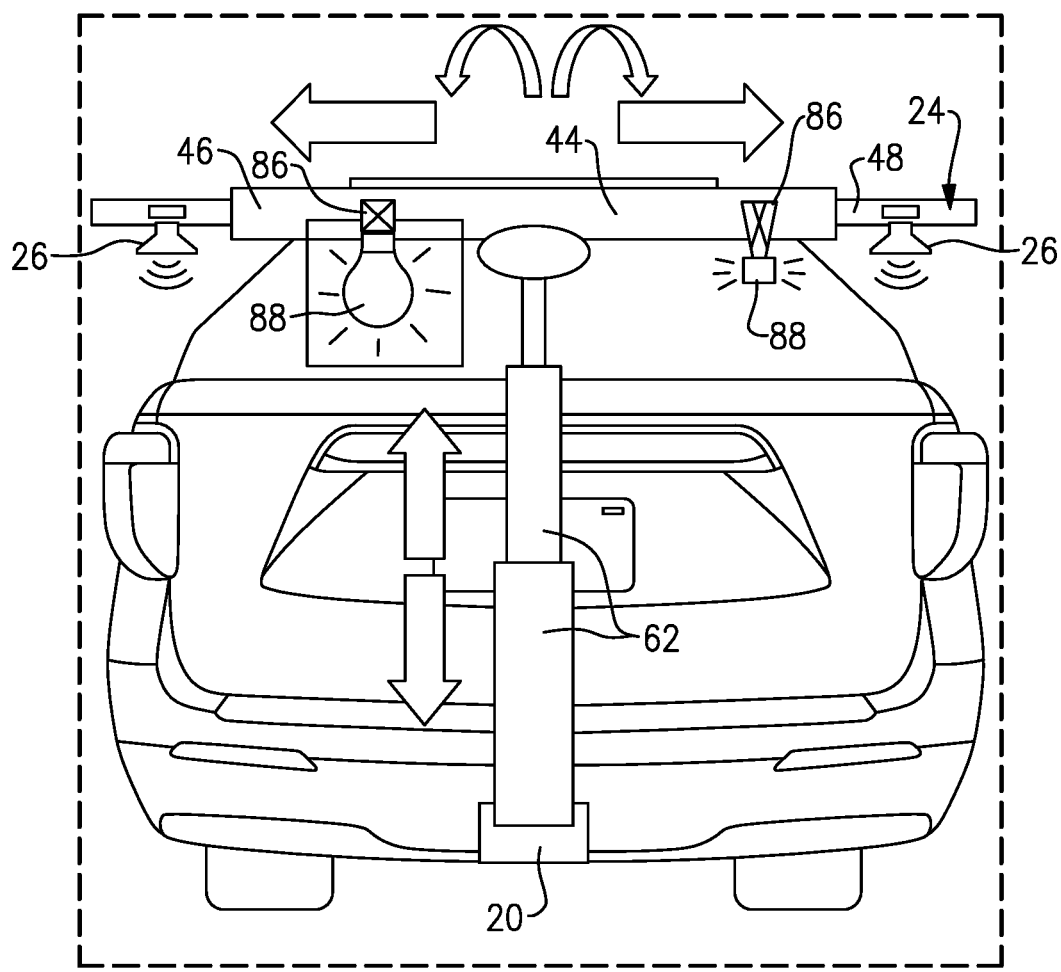
FIG. 9 shows an example of an umbrella system that includes tilting and electrical connections for additional electrical components.

In one example shown in FIG. 9, at least one additional electrical connection 86 is associated with the rigid panel 24 to connect to at least one additional electrical component 88. In one example, the at least one electrical component 88 comprises a heater, light, or a fan. In one example, lighting can be directly integrated in the panel 24 while heaters/fans can be snapped/hung manually each time they are needed.

In one example shown in FIGS. 10-11, the rigid panels 24 are selectively removable from the vehicle 10 to provide a stand-alone umbrella. In this example, the spare tire 92 serves as a stand where the bottom tubular member 62 of the support 22 is supported by the center portion of the spare tire 92. The spare tire 92 can be moved anywhere around the vehicle to position the umbrella in a desired position. Optionally, the spare tire 92 can be positioned within the truck bed 16. In one example, an adapter bracket 94 slides into a center hub opening 96 of the spare tire 92. The rubber tire isolates the vibration from the sound exciter 26. An electrical connection 98 extends from the support 22 to connect to the hitch 20 to power the sound exciters 26 and any other electrical components 88 that may be supported by the panels 24. In one example, the electrical connection 98 can comprise a wire that extends along the outside of the tubular members 62 (FIG. 11). Preferably, the tubular members 62 include electrical connection interfaces 64 with internal wiring within the tubular members 62 to protect the components from the external environment.

In one example, the rigid panels 24 of the umbrella are comprised of a material that is very stiff, and which can be injection molded. The selected material should stay structurally sound throughout its lifetime and limit the formation of voids which will affect sound quality.

In one example, a preferred material is 40% long glass filled polypropylene, which has a very high flexural modulus so it can be used to make a panel 24 that is light and stiff. The material also has a low density compared to other structural polymers which also makes the umbrella light but stiff. Stiff panels are required to get good sound quality. Stiff panels are also a requirement for load floor panels.

With conventional glass filled polypropylene, the glass is coated with a silane sizing to enable the glass fibers to bond to the polypropylene resin. Over time the vibration from sound while the sound exciters 26 are active may cause the glass fibers to delaminate from the base polypropylene polymer resin. Further, there may be a tendency to get small voids with conventional long glass polypropylene materials, which may affect the acoustic quality of the sound exciter 26. To overcome these issues, the bonding of the glass polymer interface is upgraded to be more ductile.

In one example, to the enhance the bond between the glass and the polypropylene, 3% ADMER™ QF551E is added to the long glass filled polypropylene material. ADMER™ QF551E is a maleic anhydride grafted, co-PP-based grade (MAPP) material for strong bonding between PP and metals or glass. The material by itself has 500% ductility so it can accommodate the vibrations that will be experienced by the panels 24 during use. This material has a Vicat softening point of 115° C. and remains ductile to −10° C. MAPP can be added to virtually any glass filled polypropylene compound that uses silane coatings. Additionally, experimentation has also shown that the MAPP material will significantly reduce the number and size of voids in the final compound. This will give a cleaner, clearer and more precise sound as voids dampen the sound. As such, in one example, the rigid panels 24 are formed from a material comprising polypropylene with glass fibers and maleated polypropylene (MAPP) to provide the desired stiffness and acoustic performance.

The subject disclosure provides an umbrella that is integrated into the vehicle electrically and mechanically. The disclosed umbrella is used as a speaker via integrated sound exciters. Additionally, the umbrella has a control system that has control over power generated using the "idle mitigation" feature to pull up the engine to support additional functions such as infrared heaters, lighting, fans, etc. which may require 2-3K of power. The "idle mitigation" feature can start the engine to supply power from the 48V/5-7K alternator when needed, and then turn off the engine when the need for power is reduced.

The disclosed control system also uses existing vehicle sensors to estimate a user's distance from the sound exciter and speaker orientation such that the volume of the speaker system or light/heat can be controlled as needed. For example, if the user is beyond a calibrated threshold, the speaker and/or additional electrical components will turn down the volume or turn off power to save energy. The vehicle sensors can also be used to estimate the user's position relative to the vehicle/umbrella and move the umbrella as needed to provide as much protection from the sun as possible. As such, the panels can be raised/lowered and/or tilted as needed to address rain, sun, glare, etc. Additionally, the user can control the umbrella position and sound exciters directly via their smart devices or audible communication with the vehicle. The vehicle entertainment system can be directly linked with the sound exciters and can be controlled via the vehicle and/or smart device through wireless (Bluetooth) or wired communication In one example, the user can have stored user preferences for umbrella orientation and umbrella reaction for various inputs (sun, rain, etc.) which can be stored and enabled via facial recognition of which person is using the umbrella system. Additionally, the vehicle can monitor the time and/or light content of the environment, determine what activity the user is performing, and actuate the umbrella light or change the light orientation and/or brightness as needed.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An apparatus, comprising:
   a support configured to be connected to a power source;
   at least one rigid panel stowable within a recessed storage area in a vehicle floor and being moveable between a deployed position and a stowed position, wherein the at least one rigid panel is attached to the support and comprises a shade when in the deployed position, and wherein the support is stored within the recessed storage area and covered by the at least one rigid panel when in the stowed position; and
   at least one exciter supported on the at least one rigid panel, wherein the at least one exciter is configured to selectively generate sound when powered by the power source.

2. The apparatus according to claim 1, wherein the power source comprises an electric trailer hitch receiving power from a vehicle power source.

3. The apparatus according to claim 1, wherein the at least one exciter comprises a sound generating speaker that is mounted to the at least one rigid panel.

4. The apparatus according to claim 3, including at least one vehicle sensor that estimates a user distance from the at least one exciter to control volume of the sound generating speaker, and wherein if a user moves beyond a predetermined distance the at least one exciter is turned off.

5. The apparatus according to claim 1, wherein the power source comprises a vehicle power source and wherein the at least one rigid panel is selectively removable from a vehicle to provide a stand-alone umbrella.

6. The apparatus according to claim 1, including at least one additional electrical connection associated with the at least one rigid panel to connect to at least one additional electrical component.

7. The apparatus according to claim 1, wherein the at least one rigid panel is formed from a material comprising polypropylene with glass fibers and maleated polypropylene (MAPP).

8. The apparatus according to claim 1, wherein the at least one rigid panel can be tilted between a plurality of use positions when in the deployed position.

9. The apparatus according to claim 1, wherein the support is selectively detachable from the at least one rigid panel, and wherein the at least one rigid panel forms a least a portion of a vehicle load floor that encloses the support within the recessed storage area when the at least one rigid panel is in the stowed position.

10. An apparatus, comprising:
    a support configured to be connected to a power source;
    at least one rigid panel attached to the support, the at least one rigid panel being moveable between a deployed position and a stowed position, wherein the at least one rigid panel comprises a plurality of rigid panels that are attached to each other and that cooperate to provide a shielding umbrella effect when in the deployed position; and
    at least one exciter supported on the at least one rigid panel, wherein the at least one exciter is configured to selectively generate sound when powered by the power source.

11. The apparatus according to claim 10, including a drive mechanism configured to move the plurality of rigid panels between the deployed position and the stowed position.

12. The apparatus according to claim 11, wherein, when in the stowed position, one or more of the plurality of rigid panels comprise a vehicle load floor.

13. The apparatus according to claim 12, wherein the vehicle load floor is positioned to enclose a recessed storage area.

14. The apparatus according to claim 11, wherein the plurality of rigid panels comprises at least three panels comprising a center panel, a first end panel on one side of the center panel, and a second end panel on an opposite side of the center panel, and including a center hub located on the center panel, the center hub comprising a part of the drive mechanism.

15. The apparatus according to claim 14, wherein the drive mechanism comprises a rack and pinion system including a drive gear in driving engagement with a first set of gear teeth associated with the first end panel and a second set of gear teeth associated with the second end panel, and wherein the center hub comprises the drive gear which selectively drives the first and second sets of gear teeth to move the first and the second end panels between the deployed and stowed position.

16. The apparatus according to claim 15, including a first guide rail extending along one edge of the first and the second end panels and a second guide rail extending along an opposite edge of the first and the second end panels, and wherein the first and second guide rails guide sliding movement of the first and the second end panels between the deployed position and the stowed position.

17. The apparatus according to claim 14, wherein the support comprises one or more tubular members, and wherein each tubular member has an electrical connection interface to electrically connect the tubular members to each other and to the power source.

18. The apparatus according to claim 17, including a drive shaft coupled to the center hub and an input configured to selectively drive the drive shaft which causes the center hub to rotate and move the first and the second end panels between the deployed position and the stowed position.

19. The apparatus according to claim 17, wherein the one or more tubular members are selectively detachable from each other and stored within a recessed storage area covered by a load floor, and wherein at least one of the plurality of rigid panels comprises a portion of the load floor.

20. A method comprising:
    connecting a support to a power source;
    stowing at least one rigid panel within a recessed storage area in a vehicle floor, the at least one rigid panel being moveable between a deployed position and a stowed position;
    storing the support within the recessed storage area and covering the recessed storage area with the at least one rigid panel when in the stowed position;
    attaching the at least one rigid panel to the support to provide a shade when in the deployed position; and
    supporting at least one exciter on the at least one rigid panel such that the at least one exciter can selectively generate sound via the power source.

21. The method according to claim 20, including detaching the support from the at least one rigid panel, and forming a least a portion of a vehicle load floor with the at least one rigid panel that encloses the support within the recessed storage area when the at least one rigid panel is in the stowed position.

22. A method comprising:
connecting a support to a power source, wherein the power source comprises an electric trailer hitch receiving power from a vehicle power source;
attaching at least one rigid panel to the support such that the at least one rigid panel is moveable between a deployed position and a stowed position, and wherein the at least one rigid panel comprises a plurality of rigid panels that are attached to each other and that cooperate with each other to provide a shielding umbrella effect when in the deployed position; and
supporting at least one exciter on the at least one rigid panel such that the at least one exciter can selectively generate sound via the power source.

23. A method comprising:
connecting a support to a power source;
stowing at least one rigid panel within a vehicle, the at least one rigid panel being moveable between a deployed position and a stowed position;
attaching the at least one rigid panel to the support to provide a shade when in the deployed position, wherein the at least one rigid panel comprises a plurality of rigid panels, and including moving at least one rigid panel of the plurality of rigid panels relative to at least one other rigid panel of the plurality of rigid panels to increase a size of the shade; and
supporting at least one exciter on the at least one rigid panel such that the at least one exciter can selectively generate sound via the power source.

24. An apparatus, comprising:
a support configured to be connected to a power source;
at least one rigid panel stowable within a vehicle and being moveable between a deployed position and a stowed position, wherein the at least one rigid panel is attached to the support and comprises a shade when in the deployed position, wherein the at least one rigid panel comprises a plurality of rigid panels, and wherein at least one rigid panel of the plurality of rigid panels is moveable relative to at least one other rigid panel of the plurality of rigid panels to increase a size of the shade; and
at least one exciter supported on the at least one rigid panel, wherein the at least one exciter is configured to selectively generate sound when powered by the power source.

* * * * *